United States Patent
Bielski et al.

(10) Patent No.: US 6,353,397 B1
(45) Date of Patent: Mar. 5, 2002

(54) METHOD AND DEVICE FOR SWITCHING BETWEEN DIFFERENT TYPES OF OUTPUT SIGNALS OF A POSITION MEASURING SYSTEM

(75) Inventors: Steffen Bielski, Garching/Alz; Helmut Huber, Garching/Wald a.d. Alz, both of (DE)

(73) Assignee: Johannes Heidenhain GmbH, Traunrut (DE)

(*) Notice: Subject to any disclaimer, the term of this patent is extended or adjusted under 35 U.S.C. 154(b) by 0 days.

(21) Appl. No.: 09/036,305

(22) Filed: Mar. 6, 1998

(30) Foreign Application Priority Data

Mar. 18, 1997 (DE) .......................... 197 11 215

(51) Int. Cl.⁷ .................. G08C 17/00; G08C 19/12
(52) U.S. Cl. .............. 340/870.11; 341/144; 369/43; 73/634; 33/1 PT
(58) Field of Search ............. 340/870.11; 369/43; 73/634; 341/144; 33/1 PT, 706

(56) References Cited

U.S. PATENT DOCUMENTS

| | | |
|---|---|---|
| 4,700,143 A | 10/1987 | Anthony et al. |
| 4,743,901 A | 5/1988 | Yamanoue et al. |
| 5,012,436 A | 4/1991 | Burri |
| 5,451,940 A | 9/1995 | Schneider et al. |
| 5,532,582 A | 7/1996 | Egami |
| 6,043,768 A * | 3/2000 | Strasser et al. ............ 341/144 |

FOREIGN PATENT DOCUMENTS

| | | |
|---|---|---|
| DE | 35 31 643 A1 | 3/1986 |
| DE | 39 42 159 A1 | 6/1991 |
| DE | 195 13 692 C1 | 7/1996 |
| DE | 195 04 822 C1 | 9/1996 |
| DE | 197 01 310 A1 | 8/1997 |
| JP | 8-29197 | 7/1994 |
| SU | 1124363 | 11/1984 |

OTHER PUBLICATIONS

Durchgängige Vernetzung, *Electro Automation*, (Dec. 1996).
Burkhard Werner, Titelbeitrag: Vereinfachter Sensor/Aktor–Busanschluss, *MSR Magazine*, (Mar. 1995) pp. 54–57.

* cited by examiner

*Primary Examiner*—Michael Horabik
*Assistant Examiner*—Timothy Edwards, Jr.
(74) *Attorney, Agent, or Firm*—Brinks Hofer Gilson & Lione

(57) ABSTRACT

A method and a device for switching between different types of output signals, wherein it is possible to generate at least two different types of output signals by the position measuring system which are transmitted to an evaluating unit. Switching between the different types of output signals takes place by one or several switching signals transmitted by the evaluating unit, which are transmitted over a supply line of the position measuring system.

4 Claims, 1 Drawing Sheet

METHOD AND DEVICE FOR SWITCHING BETWEEN DIFFERENT TYPES OF OUTPUT SIGNALS OF A POSITION MEASURING SYSTEM

FIELD OF THE INVENTION

The present invention relates to a method and device for switching between different types of output signals of a position measuring system wherein at least two different types of output signals can be generated by the position measuring system which are transmitted via signal transmission lines to an evaluating unit and wherein switching between the different types of output signals takes place by of one or several switching signals transmitted by the evaluating unit or a supply line.

BACKGROUND OF THE INVENTION

One known type of incremental position measuring system is designed so that analog scanning signals generated by scanning a periodic scale graduation are transmitted to an evaluating unit connected downstream. Other types of incremental position measuring systems are known where the digitalization of analog scanning signals takes place in the position measuring system itself. The digitized signals are then transmitted in rectangular form to the evaluating unit connected downstream. The digitized signals can be TTL, or HTL signals, i.e. the voltage levels of these signals are different. The selected type of signal transmission and therefore of the corresponding position measuring system respectively are a function of the requirements of the evaluating unit.

In connection with position measurement systems so far known, only a transmission of analog or digitized output signals of a defined type is possible, i.e. the transmission of only one of the various types of output signals mentioned. However, it would be advantageous if several types of output signals could be selectively available to the evaluating unit in an incremental position measuring system.

For example, in the case of the transmission of digitized output signals in TTL or HTL form only, difficulties sometimes arise when the emitted rectangular signals are to be checked with respect to the quality of the analog scanning signals. If, for example, problems occur on the scanning unit side of such a position measuring system during the measuring operation, this manifests itself in the evaluating unit only by the loss of transmitted signals. A more thorough error analysis is only possible directly at the scanning unit.

The requirement for monitoring the generated analog scanning signals furthermore arises in the course of an adjustment of such a position measuring system, or respectively in the course of a possibly required alignment of such a measuring system. If only rectangular signals are available at the output side of the scanning unit, it is necessary to detect the analog scanning signals within the scanning unit for this purpose. This again requires to open the scanning unit to allow access to the analog scanning signals.

For these reasons it has been proposed, for example, in Japanese Laid-Open Application JP 08-029197, to provide the opportunity of selectively setting a definite type of output signal in an incremental position measuring system. In this case the transmission of the analog signals is also provided along with the transmission of rectangular signals. Switching between the two different types of output signals is performed by a switching signal provided by the evaluating unit. This switching signal is transmitted on a separate line coupling the scanning unit and the evaluating unit. However, a disadvantage of this type of a position measuring system is the requirement of a separate line between the position measuring system and the evaluating unit for transmitting the switching signals.

It is thus desirable to provide a position measuring system in which the scanning unit may selectively output different types of scanning signals, i.e., analog and digital scanning signals. It is also desirable to provide a position measuring system that does not require additional transmission lines in order to provide the selectivity of different types of output signals.

SUMMARY OF THE INVENTION

It is therefore an object of the present invention to provide a method and device for switching between different types of signals output from a scanning device used in a position measuring system without requiring a separate or additional connecting lines between the scanning unit and the evaluating unit for transmitting the switching signal.

According to a preferred embodiment of the present invention, an already present supply line used to connect the position measuring system, i.e., scanning unit, and the evaluating unit is used for transmitting a switching signal. Thus, no separate or additional connecting line is required. The expenditure to implement the present invention in newly constructed position measuring systems or in refitting existing position measuring systems is therefore reduced.

In a preferred embodiment of the present invention, a switching signal of a defined length and/or a defined frequency is modulated upon the supply line and the modulation is identified on the position measuring system side. In this preferred embodiment different switching signals are available for the different types of output signals. Switching between the different types of output signals can take place using such a switching signal.

Alternatively it is also possible to use different levels of d.c. voltage distribution as a switching signal when it is desired to switch between different levels of rectangular output signals, for example, between HTL and TTL signals. Depending on the determined or detected level of the applied supply voltage as a switching signal, output signals in rectangular form with different signal levels are transmitted to the evaluating unit. In such a preferred embodiment it is only necessary to design the position measuring system so that it can be operated at different supply voltages.

A further advantage of the present invention is that the number of different structural components of position measuring systems can be reduced since it is possible to select the required type of output signal from the same position measuring system.

The device and method according to the present invention can of course be employed in connection with the most diverse types of measuring systems.

Further advantages as well as details of the device and method according to the present invention ensue from the following description of the preferred embodiments.

DETAILED DESCRIPTION OF THE PRESENTLY PREFERRED EMBODIMENTS

Figure 1:
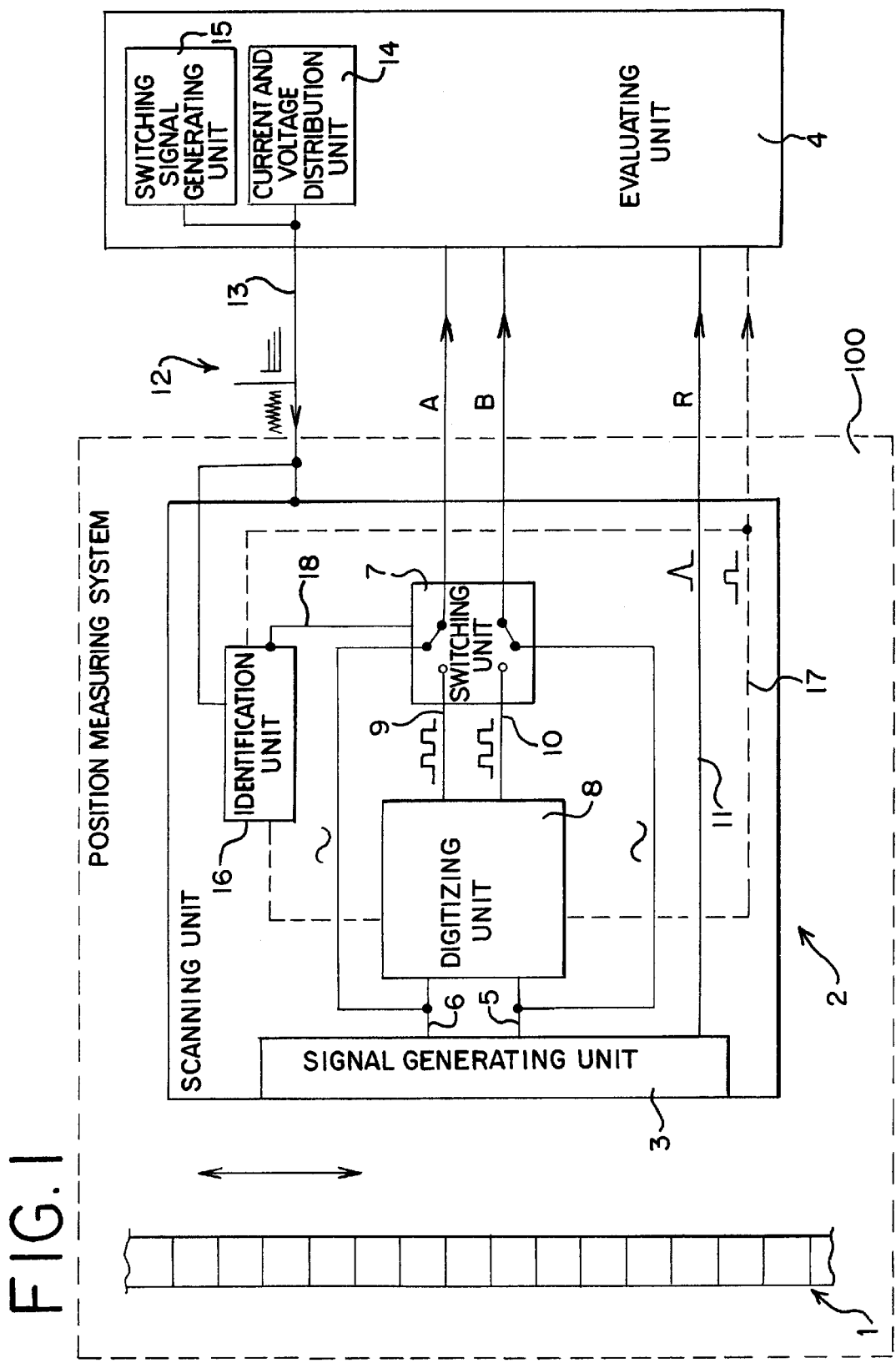
FIG. 1 is a block diagram of a preferred embodiment of a device according to the present invention.

FIG. 1 is a block diagram of a preferred embodiment of a device according to the present invention. Preferably the represented position measuring system 100 is an incremental type having a scale graduation 1 as well as a scanning unit 2 which is movable in relation to the scale graduation 1. In the course of relative movement of the scale graduation 1 and the scanning unit 2, periodically modulated analog scanning signals are generated in the signal generating unit 3 as is well known to those of ordinary skill in the art. These analog scanning signals can be further processed to determine position and direction of movement in a downstream coupled evaluating unit 4. Preferably the signal generating unit 3 provides at least two analog output signals 5, 6, which are phase-shifted by 90° with respect to one another which allows not only the determination of the relative positions of the scale graduation 1 and the scanning unit 2, but also directional discrimination as is well known.

For example, the scale graduation 1 and the scanning unit 2 of the position measuring system 100 are coupled with parts of a machine tool, for example which can be moved in relation to each other and whose relative position with respect to each other is to be determined.

The incremental position measuring system 100 can be designed in the most diverse forms. The generation of the analog scanning signals is possible optically as well as magnetically, inductively or capacitively as is well known to those of ordinary skill in the art. Depending on the physical scanning principle used, the scale graduation 1 as well as the signal generating unit 3 need to be appropriately designed. For example, in a magnetic position measuring system, an alternatingly magnetizing scale graduation 1 would be provided and the corresponding signal generating unit 3 would include, among other components, magnetically sensitive elements, for example Hall elements or magnetoresistive elements, which provide periodically modulated analog scanning signals when there is relative movement between the scale and the scanning unit. In an optical position measuring system, a reflectingly designed scale graduation 1 with alternatingly reflecting and non-reflecting areas would be provided. In turn, one or several light sources, as well as opto-electronic detector elements for detecting the light beams reflected at the scale graduation would be arranged in the signal generating unit 3.

Besides the schematically represented embodiment for detecting linear movements between the scale and scanning unit, rotatory measuring systems can of course also incorporate the teachings of the present invention.

In the scanning unit 2, the 90° phase-shifted analog scanning signals 5, 6 generated by the signal generating unit 3 are directly coupled to inputs of a switching unit 7. In addition, the phase-shifted analog scanning signals 5, 6 are also input to a digitizing unit 8 which generates digitized scanning signals 9, 10. The digitized scanning signals 9, 10, are also coupled to additional inputs of the switching unit 7. The digitizing unit 8 is designed in a known manner and includes appropriate comparators and other components which have not been represented in the drawing for reasons of clarity.

In a further preferred embodiment of the present invention, the digitizing unit 8 is designed so that depending on the level of the supply voltage applied thereto, digitized output signals of different signal levels can be generated as will be described in detail hereafter.

In the represented preferred embodiment shown in FIG. 1, at least two different types of output signals in the form of analog scanning signals 5, 6 and digitized scanning signals 9, 10 are present at inputs of the switching unit 7. The switching unit 7 is used to choose between at least two different types of output signals and selects which signals are passed to the evaluating unit 4 coupled downstream. Outputs of the switching unit 7 are connected with at least two signal transmission lines A, B between the scanning unit 2 and the evaluating unit 4 through which the selected output signals 5, 6, or 9, 10 are transmitted to the evaluating unit 4 for further processing. In addition to the transmission of the 90° phase-shifted analog scanning signals 5, 6, or the corresponding transmission of the phase-shifted digitized scanning signals 9, 10, it is also possible to transmit digitized scanning signals on one of the at least two signal transmission lines, for example A, while a signal regarding the direction of movement, which can be generated by the digitizing unit 8, is transmitted on a second signal transmission line, for example B.

In the preferred embodiment shown in FIG. 1, a further signal transmission line R is also provided between the scanning unit 2 and the evaluating unit 4 for transmitting a reference pulse signal 11, which is also generated by the signal generating unit 3 as is well known to those of ordinary skill in the art and thus need not be described in further detail.

In the schematic representation of the preferred embodiment of the present invention, for clarity purposes, the signal transmission lines A, B, R are represented singly. However, for the transmission of the various position data on the different signal transmission lines A, B, R, it is of course also possible to transmit the analog or already digitized scanning signals 5, 6, 9, 10 and the reference signal R and correspondingly inverted signals by doubling the number of transmission lines.

In order to perform the desired switch between the different types of available output signals over the signal transmission lines A and B, the transmission of a switching signal 12 between the evaluating unit 2 and the position measuring system 100 takes place over a supply line 13. Supply line 13, is an existing transmission line used to deliver current or voltage to the position measuring system 100 as is well known to those of ordinary skill in the art. In the case of a conventional d.c. supply of the scanning unit 2, as a rule two supply lines are required for this, but for the sake of clarity again only one supply line 13 has been represented in FIG. 1. For the current and voltage distribution of the scanning unit 2, a corresponding current and voltage distribution unit 14 is located in the evaluating unit 2.

The form of the switching signal transmitted over supply line 13 will depend upon the type of output signal desired For example, in one preferred embodiment, a switching signal generating unit 15 is provided coupled to the at least one supply line 13 in the evaluating unit 4. The switching signal generating unit 15 is used to modulate one or several defined switching signals 12 transmitted on the supply line 13. In a preferred embodiment different switching signals can be characterized by different lengths and/or different frequencies, so that a defined switching signal 12 can be held in readiness for about every available type of output signal.

For example, a switching signal 12 can also comprise different separate partial signals of defined length and frequency, for example, a switching signal 12 can consist of a first partial signal $U_{TS1}$ (frequency f1; length t1), a second partial signal $U_{TS2}$ (frequency f2; length t2) and a third partial signal $U_{TS3}$ (frequency f3; length t3). When using such switching signals 12, the switching signal generating unit 15 has a frequency generator which generates the different partial signals of defined frequency and length can be generated.

A switching signal 12 transmitted over the at least one supply line 13 can of course have other forms, i.e., the present invention is not to be considered limited to the above described variants of the generation of a switching signal 12. For example, as indicated above, a differing level of the supply voltage can be used as the switching signal 12. Depending on the strength of the supply voltage applied, digitized output signals at different signal levels are generated in the digitizing unit 8, for example TTL or HTL signals. It is accordingly possible to act on the current and voltage distribution unit 14 by the switching signal generating unit 15 for changing the strength of the supply voltage as required.

To detect, or respectively identify, the respective switching signal 12 in the position measuring system 100, an identification unit 16 is arranged therein which identifies possible switching signals 12 transmitted over the supply line 13 and causes a switching of the presently activated type of output signals to a different type of output signals in the scanning unit 2. For example, in the case of a modulated switching signal, decoupling of this signal 12 from the supply line 13 is performed by appropriate demodulation by the identification unit 16. Following identification of the switching signal 12, an appropriate switching signal 18 is generated by the identification unit 16 and sent to the switching unit 7. Then a switch is made by the switching unit 7, for example, from the output of analog scanning signals 5, 6 to the output of digitized output signals 9, 10, as was already explained above.

A further step can be provided in connection with a possible design of the device and method according to the present invention, after switching has been performed. An additional connecting line 17 between the evaluating unit 4 and the scanning unit 2, or respectively the digitizing unit 8, is represented by dashed lines in FIG. 1. As a rule, such a connecting line 17 is already present in position measuring systems which normally only deliver digitized output signals. In case of an occurring error in the signal generating unit 3, for example, the failure of a light source, an error signal is transmitted to the evaluating unit 4 by this connecting line 17. As a rule, the correct system status on this connecting line 17 is characterized by a logical "LOW", while the error case is identified by logical "HIGH". After switching between defined types of output signals, a confirmation signal is sent over the connecting line 17 from the position measuring system 100 to the evaluating unit 4 by which the evaluating unit 4 recognizes that the desired switching has taken place and that now data are transmitted in a different format over the signal transmission lines A, B.

The specific embodiment of the identification unit 16 in the position measuring system 100 of course is a function of the form in which a switching signal 12 is transmitted over the supply line 13, as well as which, or respectively how many, types of output signals are available. In the case of a transmission of a switching signal 12 in the form explained above, i.e., one consisting of several partial signals of different frequencies, the identification unit 16 must be able to uncouple the switching signal 12 from the supply line 13 and to compare it with a predetermined switching signal form. When a match with the predetermined switching signal form is found, an appropriate switching signal 18 for the switching unit 7 is generated in order to switch the position measuring system 100 to the respectively desired type of output signal.

However, if there is only one switching possibility between differently digitized rectangular signal forms, for example, TTL or HTL levels, the identification unit 16 can be integrated into the digitizing unit 8. The appropriate type of output signal is then generated by the digitizing unit 8, depending on the applied strength of the supply voltage. Otherwise, it is indicated by the dashed connection between the identification unit 16 and the digitizing unit 8, that in the case of different levels of the rectangular scanning signals, an appropriate signal is transmitted to the digitizing unit 8 when another supply voltage level has been detected in order to cause the output of different rectangular signals.

If only two types of output signals are provided, as in the described preferred embodiments, a respectively defined switching signal 12 can be provided for each of the two types of output signals which can be generated by the switching signal generating unit 15 in the evaluating unit 4 and must be recognizable by the identification unit 16. If several types of output signals are provided, it is of course correspondingly possible to transmit different switching signals 12 for each individual type of output signal over the supply line 13. When the respective switching signal 12 has been detected, switching to the type of output signal requested by the evaluating unit 4 then takes place.

Besides this it is also possible, particularly in case of only two types of output signals being present, to provide only a single switching signal 12 and to transmit it over the supply line 13 to the position measuring system 100 when a switch from one type of output signal to another type of output signal is desired. As soon as the switching signal 12 is recognized by the identification unit 16, switching to the respectively other type of output signal takes place. If a defined switching sequence has been preset, only one switching signal 12 could be provided in principle, even if more than two types of output signals are provided.

If only one single switching signal 12 is provided, it is possible to design the identification unit 16 in the position measuring system 100 relatively simply. For example, a Zener diode can be used as the identification unit 16 through which the current is detected as the switching signal in connection with the desired switching between digitized scanning signals in TTL or HTL form.

Accordingly, regarding the concrete design of the various described components in the evaluating unit 4 as well as in the position measuring system 100, there exist many options for realizing the respective functions in a software or hardware form. Therefore the above description should not be understood to be limiting, instead it was primarily intended to explain the functions as well as the cooperation of the elements, according to the preferred embodiments of the present invention.

It is to be understood that the forms of the invention described herewith are to be taken as preferred examples and that various changes in the shape, size and arrangement of parts may be resorted to, without departing from the spirit of the invention or scope of the claims.

What is claimed is:

1. A method for switching between different types of output signals of a position measuring system wherein at least two different types of output signals can be generated by the position measuring system, which are transmitted by signal transmission lines to an evaluating unit, and wherein the switching between the different types of output signals takes place by one or several switching signals transmitted by the evaluating unit, the method comprising:

transmitting at least a first switching signal over a supply line of the position measuring system; and transmiting a confirmation signal from the position measuring system to the evaluating unit upon the completion of switching between two different types of output signals.

2. A method for switching between different types of output signals of a position measuring system wherein at least two different types of output signals can be generated by the position measuring system, which are transmitted by signal transmission lines to an evaluating unit, and wherein the switching between the different types of output signals takes place by one or several switching signals transmitted by the evaluating unit, the method comprising:

transmitting at least a first switching signal over a supply line of the position measuring system; and transmitting at least two types of digitized scanning signals of different signal levels as the different types of output signals.

3. The method according to with claim 2 wherein different levels of the supply line are used as the first switching signal.

4. A device for switching between different types of output signals generated by a position measuring system and output to an evaluating unit, the method comprising:

signal transmission lines coupling the position measuring system and the evaluating unit wherein the at least two different types of output signals are transmitted from the position measuring system to the evaluating unit over the signal transmission lines;

a supply line coupling the position measuring system and the evaluating unit wherein a switching signal generated by the evaluating unit is transmitted to the position measuring system over the supply line; and a digitizing unit located in the position measuring system, the digitizing unit is designed so that, as a function of the applied supply voltage level, digitized scanning signals with different signal levels are generated.

* * * * *

UNITED STATES PATENT AND TRADEMARK OFFICE
CERTIFICATE OF CORRECTION

PATENT NO.    : 6,353,397 B1
DATED         : March 5, 2002
INVENTOR(S)   : Steffen Bielski et al.

Page 1 of 1

It is certified that error appears in the above-identified patent and that said Letters Patent is hereby corrected as shown below:

<u>Column 8,</u>
Line 5, delete "method" and substitute -- device -- in its place.

Signed and Sealed this

Fifth Day of November, 2002

Attest:

Attesting Officer

JAMES E. ROGAN
*Director of the United States Patent and Trademark Office*